(12) United States Patent
Van Volkenburgh

(10) Patent No.: US 9,069,975 B2
(45) Date of Patent: *Jun. 30, 2015

(54) DEVICE AND METHOD FOR CONCEALING CUSTOMER INFORMATION FROM A CUSTOMER SERVICE REPRESENTATIVE

(71) Applicant: The Western Union Company, Englewood, CO (US)

(72) Inventor: Ronald G. Van Volkenburgh, Keller, TX (US)

(73) Assignee: THE WESTERN UNION COMPANY, Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/055,457

(22) Filed: Oct. 16, 2013

(65) Prior Publication Data

US 2014/0123302 A1 May 1, 2014

Related U.S. Application Data

(63) Continuation of application No. 10/397,042, filed on Mar. 24, 2003, now Pat. No. 8,582,764.

(51) Int. Cl.
| | |
|---|---|
| *G06F 21/00* | (2013.01) |
| *G06F 21/60* | (2013.01) |
| *G06Q 20/40* | (2012.01) |
| *G06Q 20/42* | (2012.01) |
| *G07F 7/10* | (2006.01) |
| *G07C 9/00* | (2006.01) |

(52) U.S. Cl.
CPC ............ *G06F 21/60* (2013.01); *G06Q 20/4014* (2013.01); *G06Q 20/425* (2013.01); *G07C 9/00039* (2013.01); *G07F 7/1008* (2013.01); *G07F 7/1025* (2013.01)

(58) Field of Classification Search
USPC .......................................................... 726/26
See application file for complete search history.

(56) References Cited

U.S. PATENT DOCUMENTS

| | | |
|---|---|---|
| 4,600,809 A | 7/1986 | Tatsumi et al. |
| 4,656,651 A | 4/1987 | Evans et al. |
| 4,722,054 A | 1/1988 | Yorozu et al. |
| 4,866,755 A | 9/1989 | Hashimoto |
| 4,897,865 A | 1/1990 | Canuel |
| 4,958,291 A * | 9/1990 | Mamone et al. .............. 705/404 |
| 5,008,930 A | 4/1991 | Gawrys et al. |

(Continued)

OTHER PUBLICATIONS

"Load Shedding for Aggregation Queries over Data Streams";Babcock et al; Proceedings of the 20th International Conference on Data Engineering (ICDE'04) 2004 IEEE.*

(Continued)

*Primary Examiner* — Jason Lee
(74) *Attorney, Agent, or Firm* — Kilpatrick Townsend & Stockton LLP

(57) ABSTRACT

A method of concealing customer-provided information from an operator during a telephone conversation between the operator and a customer includes receiving dual-tone-multi-frequency-encoded customer information via a telephone connection to a customer telephone and generating a request asking the customer to confirm the information. The method also includes converting the dual-tone-multi-frequency-encoded customer information into an ASCII data stream and sending the ASCII data stream to a computing device, whereby the operator is unable to discern the customer information.

20 Claims, 2 Drawing Sheets

(56) References Cited

U.S. PATENT DOCUMENTS

| | | | |
|---|---|---|---|
| 5,097,528 A | 3/1992 | Gursahaney et al. | |
| 5,181,243 A | 1/1993 | Saltwick et al. | |
| 5,220,501 A | 6/1993 | Lawlor et al. | |
| 5,220,595 A | 6/1993 | Uehara | |
| 5,239,573 A | 8/1993 | Rangan | |
| 5,311,577 A | 5/1994 | Madrid et al. | |
| 5,339,358 A | 8/1994 | Danish et al. | |
| 5,351,296 A | 9/1994 | Sullivan | |
| 5,392,338 A | 2/1995 | Danish et al. | |
| 5,402,474 A | 3/1995 | Miller et al. | |
| 5,561,710 A | 10/1996 | Helms | |
| 5,592,538 A | 1/1997 | Kosowsky et al. | |
| 5,838,773 A | 11/1998 | Eisner et al. | |
| 5,854,828 A | 12/1998 | Kocis et al. | |
| 5,855,018 A | 12/1998 | Chor et al. | |
| 5,872,837 A | 2/1999 | Johnson | |
| 5,918,213 A | 6/1999 | Bernard et al. | |
| 5,966,505 A * | 10/1999 | Igarashi et al. | 358/1.9 |
| 6,104,787 A | 8/2000 | Paris | |
| 6,160,873 A | 12/2000 | Truong et al. | |
| 6,195,420 B1 | 2/2001 | Tognazzini | |
| 6,233,323 B1 | 5/2001 | Ali et al. | |
| 6,381,472 B1 | 4/2002 | LaMedica, Jr. et al. | |
| 6,487,533 B2 | 11/2002 | Hyde-Thomson et al. | |
| 6,496,570 B1 | 12/2002 | Nimphius | |
| 6,535,588 B1 | 3/2003 | Norcott, Jr. et al. | |
| 6,560,320 B1 | 5/2003 | Paleiov et al. | |
| 6,981,030 B2 | 12/2005 | Goodwin, III et al. | |
| 7,140,045 B2 | 11/2006 | Gudorf et al. | |
| 7,272,857 B1 * | 9/2007 | Everhart | 726/26 |
| 8,204,929 B2 | 6/2012 | Roginsky et al. | |
| 8,582,764 B2 | 11/2013 | Van Volkenburgh | |
| 2002/0057766 A1 | 5/2002 | Brablec | |
| 2002/0065901 A1 | 5/2002 | Goodwin, III et al. | |
| 2002/0112167 A1 | 8/2002 | Boneh et al. | |
| 2002/0133708 A1 | 9/2002 | Gudorf | |
| 2003/0084339 A1 | 5/2003 | Roginsky | |
| 2003/0097339 A1 | 5/2003 | Funck | |
| 2003/0097596 A1 | 5/2003 | Muratov | |

OTHER PUBLICATIONS

Author Unknown, Microsoft Computer Dictionary, p. 36, 2002, 1 page.

Amoroso, Fundamentals of Computer Security Technology, 1994. pp. 39-40.

Deswarte, "Diversity Against Accidental and Deliberate Faults", Computer Security, Dependability, and Assurance: From Needs to Solutions, IEEE, 1999, 11 pages.

* cited by examiner

DEVICE AND METHOD FOR CONCEALING CUSTOMER INFORMATION FROM A CUSTOMER SERVICE REPRESENTATIVE

CROSS-REFERENCE TO RELATED APPLICATIONS

This application is a continuation of U.S. patent application Ser. No. 10/397,042, filed Mar. 24, 2003, and entitled, "DEVICE AND METHOD FOR CONCEALING CUSTOMER INFORMATION FROM A CUSTOMER SERVICE REPRESENTATIVE." The entire disclosure of the above application is hereby incorporated by reference, for all purposes, as if fully set forth herein.

BACKGROUND OF THE INVENTION

The present invention relates generally to receiving data via a telephone connection, and more particularly to receiving customer-centric data and converting it to computer-readable signals, while masking the data from an operator.

Telephones provide the most common means by which many individuals communicate with businesses from which they receive services, particularly financial services. In many cases, the customer interface is an "operator" (a.k.a. customer service representative, account representative, and the like) manning a telephone in a call center. Also in many cases, the customer is required to provide sensitive information to this unknown person.

For example, if a customer wishes to settle an outstanding account balance by providing payment information by telephone, the customer may give a credit card number, debit card number, checking account number, or the like to the operator.

The present invention provides a device and method for using the device that allows a customer to provide sensitive information during a telephone conversation with a live operator in a way that conceals the sensitive information from the operator.

BRIEF SUMMARY OF THE INVENTION

Embodiments of the present invention thus provide a data masking device including a first input for receiving first electronic signals representing customer information and a first output for sending second electronic signals to a computing device. The device also includes a second output for transmitting masked signals intended to indicate to an operator that a customer is entering customer information and circuitry for converting the first electronic signals into the second electronic signals and the masked signals. The circuitry may be operable to generate a confirmation request message directed to the customer and receive a confirmation from the customer. The first electronic signals may include dual-tone-multi-frequency signals. The second electronic signals may include ASCII characters. The second electronic signals may include encrypted signals. The masked signals may include dual-tone-multi-frequency signals directed to a headset of the operator. The masked signals may include masking characters directed to a display device.

In other embodiments of the present invention, a method of concealing customer-provided information from an operator during a telephone conversation between the operator and a customer includes receiving dual-tone-multi-frequency-encoded customer information via a telephone connection to a customer telephone and generating a request asking the customer to confirm the information. The method also includes converting the dual-tone-multi-frequency-encoded customer information into an ASCII data stream and sending the ASCII data stream to a computing device. In this way, the operator is unable to discern the customer information. The method may include generating masking signals and sending the masking signals to a display device. In this way the masking signals are intended to provide the operator with a visual indication that the customer has entered information. The display device may include a computer monitor associated with the computing device. The display device may include a liquid crystal display panel. The display device may include a LED display. The method also may include generating masking signals and sending the masking signals to a headset of the operator. The masking signals may include the dual-tone-multi-frequency-encoded customer information. The masking signals may include generic tones. The request asking the customer to confirm the information may include a computer-generated voice. The computer-generated voice may be in Spanish. The dual-tone-multi-frequency-encoded information may be generated by a reader. In which case the reader may include a device for reading magnetic information from a card of the customer having a magnetic stripe encoded with the information and/or a device for reading information from a document having magnetic ink printing.

In still other embodiments, a method of concealing customer-provided information from an operator during a telephone conversation between the operator and a customer includes providing a data masking device that is operable to receive dual-tone-multi-frequency-encoded customer information via a telephone connection to a customer telephone and generate a request asking the customer to confirm the information. The data masking device is further operable to convert the dual-tone-multi-frequency-encoded customer information into an ASCII data stream and send the ASCII data stream to a computing device. The method also includes initiating a telephone exchange with a customer, receiving dual-tone-multi-frequency-encoded customer information at the data masking device, and using the data masking device to conceal the customer information from the operator.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

DETAILED DESCRIPTION OF THE INVENTION

Figure 1A:
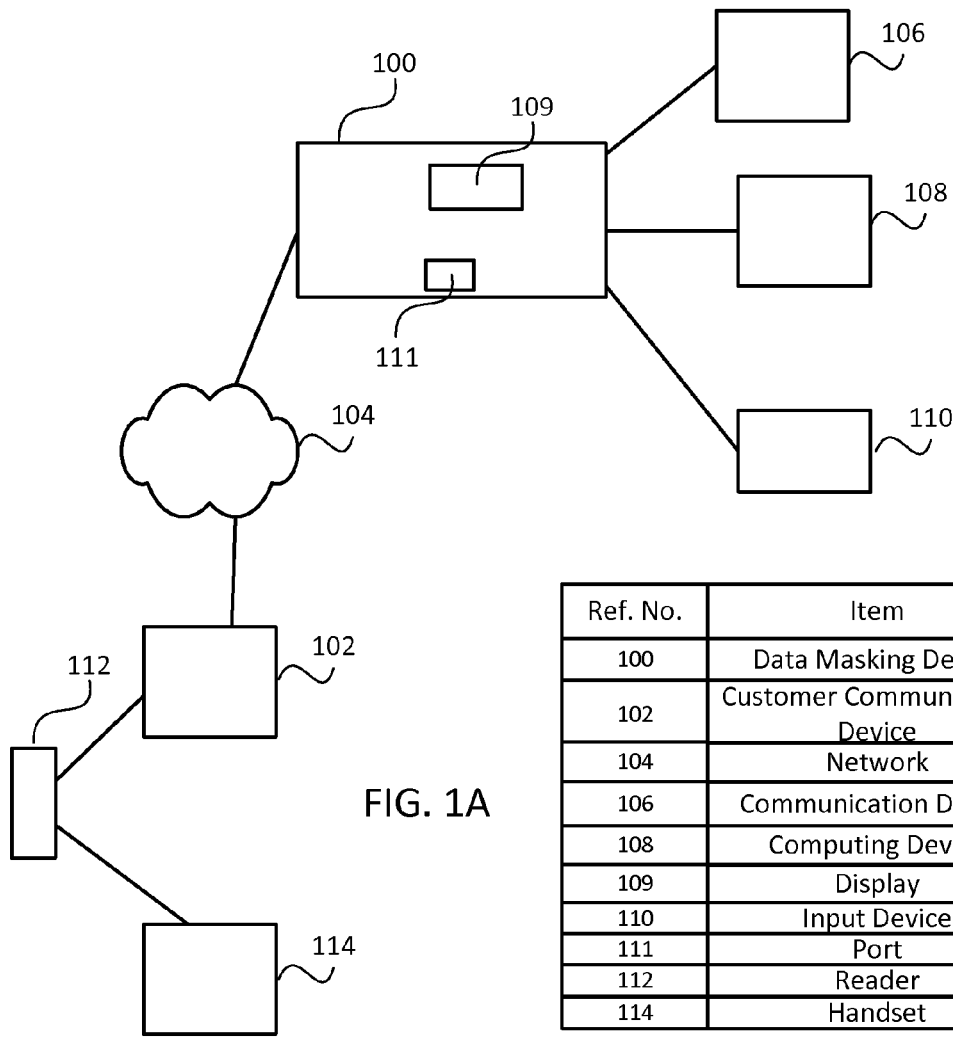
FIG. 1a illustrates one example of a system that employs a data masking device according to embodiments of the present invention.

According to the present invention, a customer of a business may provide sensitive information without revealing the information to an operator acting on behalf of the business. As an example, a customer of a utility company contacts the utility company to pay his utility bill. The utility company may employ a system whereby the customer may pay by check, debit card, credit card, or the like by providing account information to an operator. The operator may be an employee of the utility company or an employee of a vendor hired by the utility company to provide telephone payment services. At the appropriate point in the conversation with the customer, the operator asks the customer for payment account information. In response, instead of providing the information verbally, the customer provides the information by "keying" the information using, for example, a telephone keypad, cell phone keypad, keyboard, reader, or the like, thus encoding it into tones or other electronic signals.

The tones generated by the customer are received by a data masking device designed according to the teachings of the present invention. The data masking device converts the signals into computer-readable signals and sends the computer-readable signals to a computer. In some embodiments the computer-readable signals may be encrypted. Thus, instead of verbally providing the sensitive information to the operator who then enters it into the computer, the customer is essentially entering the information directly into the computer, thus avoiding disclosure of the information to the operator.

A number of enhancements to the data masking device make it even more useful. For example, the data masking device may capture the information entered by the customer, repeat it back to the customer, and request confirmation from the customer that the information was entered correctly. This may all take place before the device sends any data to the computer. Only after the customer confirms the information does the device send the information to the computer. In some embodiments, the device may be programmed to repeat the information back to the customer in a language selected by the customer from a group of several languages.

Another enhancement provides visual and/or audible feedback to the operator that the customer is entering information. For example, a display on the data masking device itself may display a masking character, such as an asterisk (*), for each digit entered by the customer. The masking character also or alternatively may be displayed in a data field on the display screen of the operator's computer. In some embodiments the operator may hear tones confirming that the customer is entering information. The tones may be the same tones generated by the customer or may be masking tones that do not disclose the information.

Yet another enhancement allows the customer to enter information using a different input device. For example, the customer may enter the information using an alphanumeric keypad that provides more capability than the simple number keypad found on most telephones. Thus, the customer is able to enter information having alpha characters as well as number characters. In some embodiments, the customer may enter the information using a reader that can read the MICR lines of a check or the magnetic stripe of a credit card or debit card. Thus, the customer can "swipe" his card or "scan" his check, rather that keying the information into the telephone keypad. This reduces the opportunity for entry errors. In the case of the card reader, the reader may be configured to read other information encoded on the card, such as the expiration date, security information, and the like. Either reader device my be configured to accept an input from the customer that acts as an electronic signature.

As will be seen, the present invention is not limited to entering account information to pay utility bills. For example, the customer may enter a password or other sensitive information that may be needed by an operator. Further, the operator may represent any number of business entities. For example, the operator may be employed by a credit card company, mail order company, travel company, home shopping network, or the like, and the sensitive customer information may be the customer's account number, password, personal identification number (PIN), social security number, or the like. Many other examples are possible and are apparent to those skilled in the art in light of the disclosure herein.

Having described the present invention generally, attention is directed to FIG. 1a, which illustrates one embodiment of a data masking device 100 according to the present invention. As those skilled in the art will realize other embodiments, the example of FIG. 1a is not to be considered limiting. The device 100 is connected to a customer communication device 102, which may be, for example, a telephone. The connection is via a network 104, such as the Public Switched Telephone Network (PSTN). In some embodiments, the network is a wireless network that provides a connection for customers using wireless phones or cell phones. The device 100 also is connected to a communication device 106, such as a telephone or telephone headset of an operator. The device 100 simply passes vocal frequencies through to the operator's communication device 106, thus enabling the customer to talk to the operator in the traditional way. However, the customer also may enter sensitive information using, for example, a keypad on the customer communication device 102, in which case the device 100 decodes the information and sends it to a computing device 108.

In a specific embodiment, the sensitive information entered by the customer is encoded into a Dual-Tone-Multi-Frequency (DTMF) signal stream, as is known in the art. The device 100 receives the information and provides audible and/or visual confirmation to the operator that the customer is entering information. Audible confirmation may be provided by simply passing the DTMF signal stream to the operator's communication device 106. In most cases, this provides sufficient audible masking of the customer's sensitive information. However, if further audible masking is desired, the device 100 may send masking tones to the operator's communication device 106. The masking tones may be the same for each data character entered by the customer, may be randomly generated, or the like. Visual confirmation of the customer's entry may be achieved while masking the information by entering masking characters into a data field on a display associated with the operator's computing device 108. Alternatively or additionally, visual confirmation may be achieved by displaying masking characters on a display 109 on the device 100. This may be an LCD or LED screen or the like. In some embodiments, the visual confirmation is simply a series of flashes displayed by a single LED. Many other examples are possible.

Continuing with this specific example, the device 100 captures the information entered by the customer and, using a computer-generated voice, repeats the information back to the customer, and asks the customer to confirm the information. This may be done by asking the customer to select specific keys on the keypad (e.g., "If this is correct, press 1. If this is incorrect, press 2.") Once the customer confirms the information, the device 100 converts the information into a computer-readable signal stream and sends it to the computing device 108. The computer-readable signal stream may be, for example, an ASCII bit stream, as is known in the art. In some embodiments, the device 100 may be arranged such that signals sent from an operator's input device 110, such as a keyboard, are routed through the device 100. Thus, the device 100 may convert the DTMF signal stream into a signal stream using based on the same protocol used by the input device 110 to communicate with the computing device 108.

The device 100 also may include a port 111 for receiving programming information. The port 111 may be based on any of a wide variety of well known communication protocols, including serial (9 pin), USB (1.0 or 2.0), FireWire (IEEE 1394), and Infrared (IR). In some examples, the port 111 provides a wireless interface by which the device 100 receives programming.

In some embodiments, the customer enters information using a reader 112 located, for example, between the customer's communication device 102 and a handset 114 associated with the customer's communication device. The reader 112 may be configured to read information from a "MICR" line of a check and/or configured to read information from a magnetic strip on a credit or debit card. Thus, the customer may scan information from a check or swipe a card to encode the sensitive information. The reader may encode the information into DTMF signals or other signal streams. Other examples are possible.

Figure 1B:
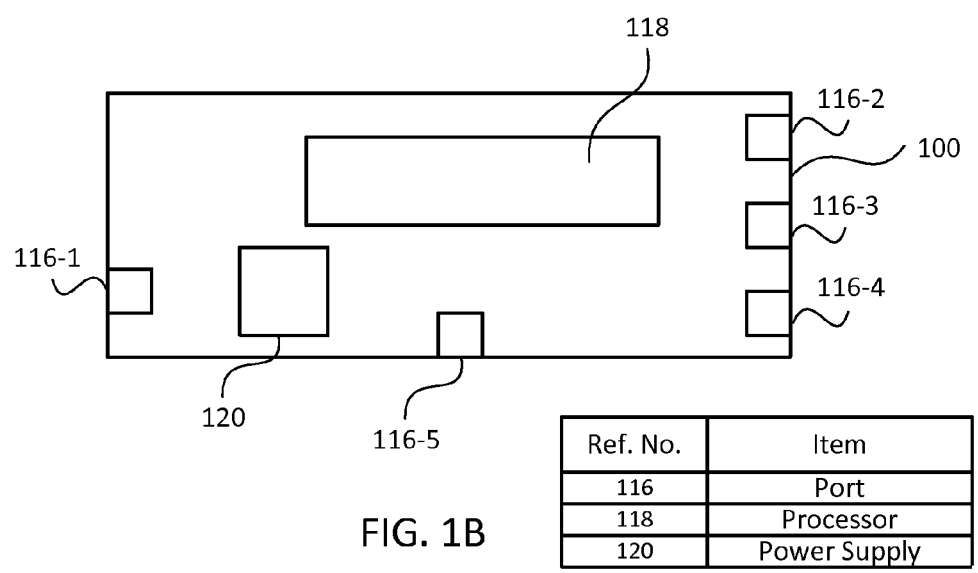
FIG. 1b illustrates an embodiment of a data masking device in greater detail.

Attention is directed to FIG. 1b, which illustrates the data masking device 100 in greater detail. The device includes one or more ports 116, as previously described. The ports 116 may be input ports, output ports, two-way ports, wired ports, wireless ports, and the like. The device 100 also includes a processor 118. The processor may be any of a wide variety of programmable processors know to those skilled in the art. In some embodiments, the processor is an Application Specific, Integrated Circuit (ASIC), as is known. Many other examples are possible. The device 100 also may include a power supply 120, which could be a battery, for example, although the device could be configured to draw power from either the computing device 108 or the input device 110. It should be understood that the example of a data masking device 100 of FIG. 1b is not to be considered limiting.

Figure 2:
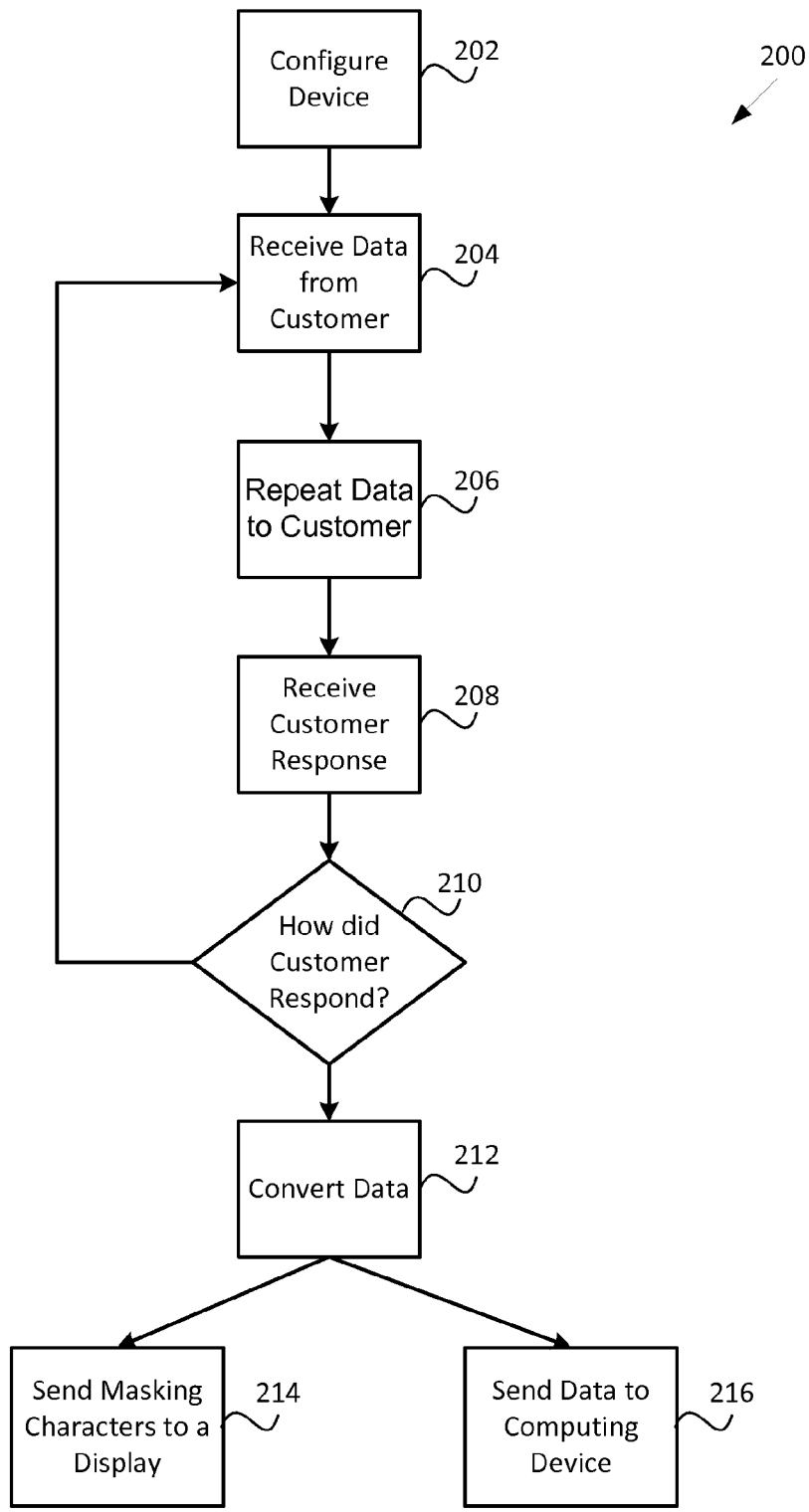
FIG. 2 illustrates a method of using a data masking device, such as the masking device of FIG. 1.

Having described a device according to the present invention, attention is directed to FIG. 2, which illustrates a method 200 according to the present invention. The method 200 may be carried out using the data masking device 100 of FIG. 1. At block 202, a data masking device is configured for operation. For example, configuration programming may include programming the device to generate responses in either English or Spanish at the option of a customer.

At block 204, the device receives and captures encoded information from a customer who is engaged in a conversation with a live operator. The customer may encode information according to any of the teachings discussed with respect to FIG. 1. For example, the customer may key the information using a telephone numeric keypad, an alpha character keyboard, a card or check reader, or the like. As the customer enters the information, the device may pass confirmation tones to the operator's communication device. The confirmation tones may include masking tones or may simply be the tones generated by the customer. Alternatively or additionally, the device may send masking characters to a display. In some embodiments, the masking characters are not sent to a display until block 214, as will be described.

At block 206, the masking device repeats the information back to the customer and requests confirmation of the information from the customer. This may be done using a computer-generated voice in a language selected by the customer. The customer's response may be in the form of a specific digit for "yes" and a different specific digit for "no."

At block 208, the device receives the customer's response. At block 210, the response is evaluated. If the customer indicates that the information was entered incorrectly, the process returns to block 204. If the customer confirms the information, the process continues at block 210.

At block 212, the encoded information from the customer is converted to a computer-readable data stream. This operation may involve, for example, converting a DTMF data stream into an ASCII bit stream.

At block 214, the device causes masking characters to be displayed on a display device. The display device may be located on the masking device itself. It may be for example, a LCD screen, and LED screen, a series of LEDs, or the like. The display device also may be a computer display screen used by the operator, in which case the masking device may cause masking characters to be displayed in a data field representing the sensitive information entered by the customer. Other examples are possible.

At block 216, the computer-readable data stream is routed to a computing device. The computing device may treat the data stream as if it were entered by the operator. In examples wherein the masking device is inserted between the operator's keyboard and the operator's computing device, the computing device may not be able to tell the difference between data entered by the operator using the keyboard and data generated by the masking device in response to a customer's input.

In some embodiments, the device encrypts the data stream it send to the computing device. This further prevents unauthorized access to the data. The data encryption/decryption process may include one of several methods. For example, a decryption library may be used. The decryption library may be loaded on the computing device and used to convert the incoming encrypted data stream into meaningful information. In another example, the data stream may be decrypted using an algorithm that may be specific to the customer's account. In this way, the algorithm may control access to different customer information based on a user's access level. Other examples are possible, each of which, renders the data stream exiting the device useless unless the decryption process is included.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. For example, those skilled in the art know how to design and manufacture electronic circuitry to function according to the teachings of the present invention. Accordingly, the above description should not be taken as limiting the scope of the invention, which is defined in the following claims.

What is claimed is:

1. A device comprising:
   one or more ports for at least:
      receiving one or more first signals comprising sensitive customer information;
      sending one or more second signals to a computing device; and
      sending one or more masked signals that indicate to an operator that a customer is entering the sensitive customer information, without revealing the sensitive customer information to the operator; and
   a hardware processor for at least:
      converting the one or more first signals into the one or more second signals; and
      converting the one or more first signals into the one or more masked signals, wherein converting the one or more first signals into the one or more masked signals comprises masking at least a portion of the one or more first signals, and wherein the one or more masked signals do not reveal the sensitive customer information.

2. The device of claim 1, wherein the one or more ports are further for at least:
sending the one or more first signals to the customer so that the customer can confirm the sensitive customer information is correct.

3. The device of claim 2, wherein the one or more ports are further for at least:
receiving an indication of whether the sensitive customer information is confirmed as being correct.

4. The device of claim 3, wherein:
the hardware processor is further for at least determining, based on the indication, that the sensitive customer information is not confirmed as being correct;
the one or more ports are further for at least receiving another one or more first signals comprising sensitive customer information.

5. The device of claim 1, wherein:
the sensitive customer information originates from a check having a Magnetic Ink Character Recognition ("MICR") line.

6. The device of claim 1, wherein:
the sensitive customer information originates from a magnetic stripe on a credit card or a debit card.

7. The device of claim 1, wherein:
the sensitive customer information originates from a telephone keypad or a cell phone keypad.

8. The device of claim 1, wherein the one or more masked signals comprise:
masked audible tones.

9. The device of claim 8, wherein the masked audible tones are selected from a group consisting of:
a constant tone for each character provided by the customer; and
a random tone for each character provided by the customer.

10. The device of claim 8, wherein:
the masked audible tones are reproduced for hearing by the operator.

11. The device of claim 1, wherein the one or more masked signals comprise:
masked visual characters.

12. The device of claim 11, wherein:
the masked visual characters are displayed on an operator display for viewing by the operator.

13. A method comprising:
receiving, at one or more ports, one or more first signals comprising sensitive customer information;
sending, from the one or more ports, one or more second signals to a computing device;
sending, from the one or more ports, one or more masked signals that indicate to an operator that a customer is entering the sensitive customer information, without revealing the sensitive customer information to the operator;
converting, by a hardware processor, the one or more first signals into the one or more second signals; and
converting, by the hardware processor, the one or more first signals into the one or more masked signals, wherein converting the one or more first signals into the one or more masked signals comprises masking at least a portion of the one or more first signals, and wherein the one or more masked signals do not reveal the sensitive customer information.

14. The method of claim 13, further comprising:
sending, from the one or more ports, the one or more first signals to the customer so that the customer can confirm the sensitive customer information is correct.

15. The method of claim 14, further comprising:
receiving, at the one or more ports, an indication of whether the sensitive customer information is confirmed as being correct.

16. The method of claim 15, further comprising:
determining, by the hardware processor, based on the indication, that the sensitive customer information is not confirmed as being correct;
receiving, at the one or more ports, another one or more first signals comprising sensitive customer information.

17. A non-transitory machine readable medium comprising instructions executable by a hardware processor for at least:
receiving one or more first signals comprising sensitive customer information;
sending one or more second signals to a computing device;
sending one or more masked signals that indicate to an operator that a customer is entering the sensitive customer information, without revealing the sensitive customer information to the operator;
converting the one or more first signals into the one or more second signals; and
converting the one or more first signals into the one or more masked signals, wherein converting the one or more first signals into the one or more masked signals comprises masking at least a portion of the one or more first signals, and wherein the one or more masked signals do not reveal the sensitive customer information.

18. The non-transitory machine readable medium of claim 17, wherein the instructions are further executable for at least:
sending the one or more first signals to the customer so that the customer can confirm the sensitive customer information is correct.

19. The non-transitory machine readable medium of claim 18, wherein the instructions are further executable for at least:
receiving an indication of whether the sensitive customer information is confirmed as being correct.

20. The non-transitory machine readable medium of claim 19, wherein the instructions are further executable for at least:
determining, based on the indication, that the sensitive customer information is not confirmed as being correct; and
receiving another one or more first signals comprising sensitive customer information.

\* \* \* \* \*